United States Patent

Philippi

[15] 3,686,976
[45] Aug. 29, 1972

[54] HYDRAULIC LIMITED SLIP AND STABILIZING DIFFERENTIAL GEARING UNIT

[72] Inventor: Eugene O. Philippi, 1331 E. Northlake Ave., Appleton, Wis. 54911

[22] Filed: July 10, 1970

[21] Appl. No.: 53,849

[52] U.S. Cl. ................................. 74/711, 192/61
[51] Int. Cl. ....................... F16h 1/44, F16d 31/04
[58] Field of Search ........... 74/711; 192/61; 184/6.12

[56] References Cited

UNITED STATES PATENTS

| | | |
|---|---|---|
| 2,368,437 | 1/1945 | Alexandrescu ......... 192/58 A |
| 3,109,323 | 11/1963 | Saurer ..................... 74/711 |
| 3,158,042 | 11/1964 | Saurer ..................... 74/711 |
| 3,494,255 | 2/1970 | Richardson ............. 418/61 |

*Primary Examiner*—Arthur T. McKeon
*Attorney*—Andrus, Sceales, Starke & Sawall

[57] ABSTRACT

A cup-shaped housing is integrally formed with the inner face of a wheel axle side gear of a differential gearing and projects forwardly into abutting engagement with the opposed face of the opposite wheel side gear. An eccentric opening with the axis offset with respect to the wheel axis is provided in the housing with a stator mounted therein and having an inner five-point star-configured stator opening. A four-lobed rotor within the stator opening is integrally formed with the second side gear and meshes with the stator opening. An outer o-ring sealing flange on the rotor mates with a corresponding circular housing recess to seal the stator chamber which is filled with an hydraulic transmission oil. The stator and rotor cooperate to establish a hydraulic interlock permitting normal straightaway and turning of the vehicle. If the drive shaft torque tends to transfer to one wheel, restricted movement of the oil creates a hydraulic loading to distribute torque to both wheels.

5 Claims, 6 Drawing Figures

Patented Aug. 29, 1972

INVENTOR.
EUGENE O. PHILIPPI
BY
Andrus, Sceales, Starke & Sawall
Attorneys

FIG. 3
FIG. 4
FIG. 5
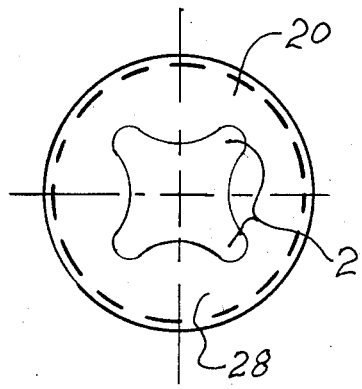
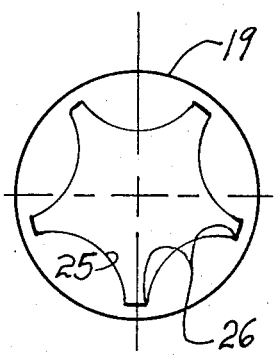
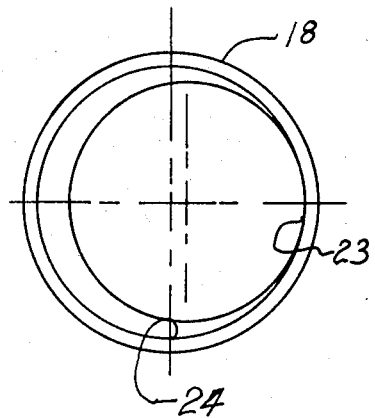
FIG. 6
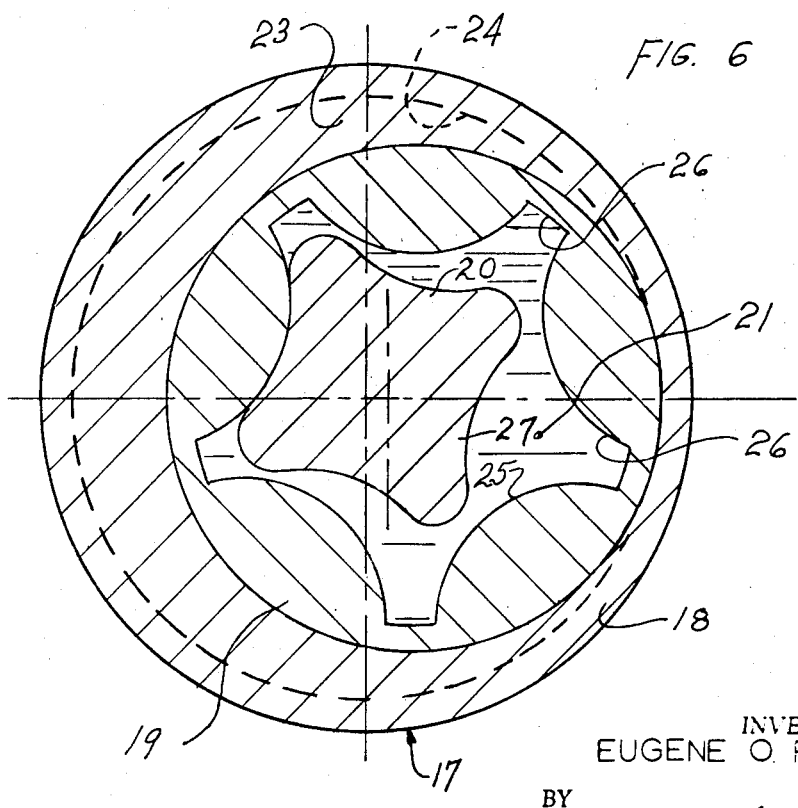
INVENTOR
EUGENE O. PHILIPPI
BY
Attorneys

HYDRAULIC LIMITED SLIP AND STABILIZING DIFFERENTIAL GEARING UNIT

BACKGROUND OF INVENTION

This invention relates to a hydraulic-driven limited slip differential gearing for vehicles and the like.

Differential gearing has been employed in vehicles to permit the rear wheels to revolve at different speeds when the automobile turns a corner or the like. Limited slip differentials have been proposed to minimize the disadvantages of differentials when employed in areas where one of the wheels may tend to slip with the result that all of the motion is transferred to the slipping wheel. Thus, if one of the wheels of an automobile is slipping on ice, snow or the like, the output or drive is coupled through the differential action to such wheel while the other wheel which has some traction remains immovable. The limited-slip differential provides a mechanical means generally through a clutch-braking system to avoid such interaction. For example, a limited slip differential may have the differential pinion gears mounted for relative movement on suitable cam surfaces. When both wheels are running at essentially the same speed with power supplied to both wheels from the drive shaft mechanism, the pinion shafts tends to move up the cam surfaces, collapsing the clutch mechanism to directly couple the differential cage to the wheel shafts. This is the normal operation on a straightaway for a differential. On a curve, the overrunning outer wheel, resulting from turning of the automobile, results in the pinion rotating relative to the cage. This reduces the load or torque on the pinion shafts which tends to move to a releasing position and establish a normal differential action. With one of the wheels spinning on ice or any other relatively minimal friction surface with the opposite wheel on a relatively substantial holding frictional surface, the spinning wheel's greater speed is not because of overrunning, as in the previous example, but because of most or essentially all of the input torque or power. This causes the pinion shafts to move up the cam surface and engage the clutch to lock the differential as a single unit thereby simultaneously transferring power to the other wheel. This establishes even greater torque with a consequent further tightening of the clutch.

Although such differential drives have been and are available on a optional basis for motor vehicles and the like, they are relatively expensive. Further, the mechanical construction has certain disadvantages from the standpoint of reliability, life and the like.

SUMMARY OF PRESENT INVENTION

The present invention is particularly directed to an improved hydraulic limited slip differential which provides a highly reliable and improved interlock between an input means and a pair of output means such as the drive shaft and the opposite aligned wheel axles of a vehicle to maintain proper torque distribution between the latter wheel axle. Generally, in accordance with the present invention, a hydraulic unit is coupled to a pair of the gears of the differential unit. The two operating members of the hydraulic unit form a circulating pump. For example, the members may be provided with complementing undulating surfaces adapted to rotate relative to each other with a fluid filling the space therebetween. Under normal differential action, the members will rotate simultaneously with the differential gear. In moving around a corner, the one member will be driven at a greater speed than the opposite member. The relative rotation between the undulating members provides a relatively slow rotation such that the liquid will flow reasonably readily therebetween, thereby minimizing and preventing undue loading while allowing normal differential action. Slipping conditions, however, would require a relatively rapid relative speed between the two operating members. The clearance and the hydraulic liquid is selected such that as the speed tends to increase, the restricted flow establishes a loading of the members which tends to lock the members together and transfer the energy from the one tending to rotate rapidly to the opposite one thereby limiting the separate relative rotation. This causes the gearing of the differential to rotate as a single unit and thereby drive the opposite wheel. As a result, the relative slipping action is minimized and torque is provided to the opposite wheel which would normally be standing still, thereby producing forward action on the vehicle.

In a particularly novel construction, the limited slip differential mechanism includes a housing which is generally cup-shaped with the base secured to or integrally formed with the inner face of the one gear of a differential gearing such as a first side gear. The cup member or housing projects forwardly into abutting engagement with an opposed face of the opposite or second side gear. The housing includes an eccentric opening having its axis offset with respect to the wheel axis. A stator is mounted within the eccentric opening and includes an inner generally star-configured stator opening. The several points are generally provided with blunted ends interconnected to each other by smoothly-curved connections such that any straight line through the center of the stator between opposed peripheral points is of a constant length. A rotor telescopes within the stator opening and is provided with equicircumferentially and diametrically oppositely located projections interconnected by relatively smooth inwardly curved surfaces. In the assembled relationship, the flange portion of the rotor is secured to or integrally formed with the opposite gear. The outer end of the rotor arms or projections are rounded to present a smooth surface and the distance between the outermost portions of each pair of oppositely extended arms is slightly less than the constant diametrical length of the stator opening to establish a small clearance between the ends of the arms and the wall of the stator opening. The rotor is concentrically mounted within the stator with an outer sealing flange mating with a corresponding circular recess in the outer end of the housing. The flange is preferably provided with an O-ring seal or other means to essentially provide a liquid-tight sealing of the stator chamber which is filled with a suitable liquid such as hydraulic transmission fluid or the like. In the operation, relative rotation of the gears of the differential gearing results in a corresponding rotation of the eccentric stator and rotor. This, in turn, causes the stator to tend to rotate and move with the rotor. If a wheel is overrunning as a result of turning a corner or the like and thus being separately driven, the tolerances are such that the liquid can flow between the respective lobes or arms of the rotor and the wall of the stator opening to permit the relative rotation and differential action. As the difference in speed tends to increase as a result of the input torque transferring to one wheel, the related tendency to increase the speed of the rotor and stator is prevented by the inability of the fluid to move rapidly through the clearance and a hydraulic lock is established to distribute torque to both wheels.

In particularly novel and highly satisfactory construction, the present invention is particularly adapted to incorporation into conventional, existing differential gear units. Thus, it is merely necessary to modify or replace the differential side gears, or a pair of the pinion gears, with the hydraulic mechanism which can be readily adapted to fit within the space or free space presently available between the side gears or the pinion gears.

Although described as being interconnected between the side gears, a corresponding action can be established by interconnection of the hydraulic members between the pinion gears. Applicant has found that this invention provides a continuous and smooth interconnection of the two side or driven gears which permits the necessary differential movement of the driven gears and attached wheels while producing a continuous and progressive speed-related limited slipping. Applicant has found that the response characteristic and the continuous interaction results not only in the normal differential action but produces a very substantial improvement in the handling and stability of the vehicle. Thus, the conventional automobile is generally substantially affected by rough surfaces and passing of large vehicles such as semitrailer trucks and the like. With the present invention, applicant has found that effects of such normal disturbances on an automobile are substantially minimized and maintains a smooth continuous steering and handling. Apparently, the continuous hydraulic limited slippage resulting from the present invention maintains the necessary positive equalized and interrelated torque or drive on the driven wheels to avoid the instability encountered with the conventional differential units which are presently manufactured and sold. The present invention thus provides an improved handling of a vehicle and contributes to the safety of operation.

The present invention thus provides a reliable and simple hydraulic pumping mechanism for coupling of the differential gears of a differential unit to maintain or essentially prevent the undesired driving or transfer of the energy to only one of the two or more wheels coupled thereto.

BRIEF DESCRIPTION OF DRAWINGS

The drawings furnished herewith illustrate the preferred construction of the present invention in which the above advantages and features are clearly disclosed as well as others which will be readily understood from the following description.

In the drawings:

FIG. 3 is a view taken generally on line 3—3 of FIG. 2;

FIG. 4 is a view taken generally on line 4—4 of FIG. 2;

FIG. 5 is a view taken generally on line 5—5 of FIG. 2; and

FIG. 6 is a sectional view taken generally on line 6—6 of FIG. 1 to show the interpositioning of the elements of the hydraulic unit.

Figure 1:
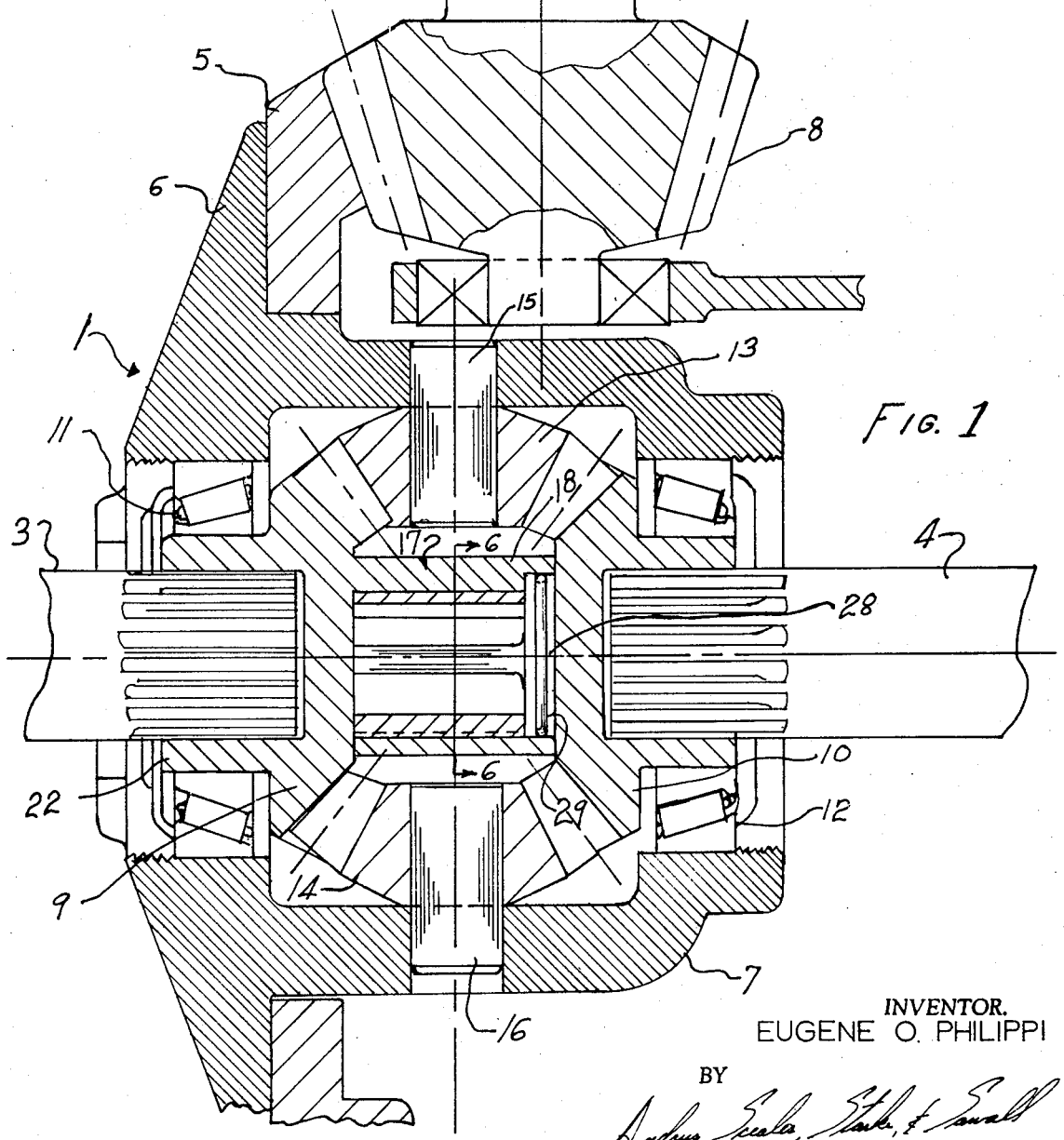
FIG. 1 is a sectional view through the differential unit constructed in accordance with the present invention.

Referring to the drawings and particularly to FIG. 1, the present invention is shown applied to an automobile differential gearing unit 1 which is adapted to interconnect and couple a drive shaft 2 to a pair of oppositely extended wheel axles 3 and 4, the outer ends of which are connected to the driven wheels in any known or desired manner, not shown. The automobile differential unit generally includes an outer differential housing or cage which is rotatably mounted within an outer differential housing forming a part of the axle and drive shaft support, not shown. A bevel ring gear 5 is secured to a flange 6 on the differential housing or cage 7 and meshes with a bevel pinion 8 rigidly interconnected to the drive shaft 2. A pair of side gears 9 and 10 are rotatably mounted within the opposite sides of the differential cage 6 by suitable tapered bearing units 11 and 12 on wheel axis and normal to the drive shaft axis. The side bevel gears are interconnected to each other and to the cage 7 by differential pinion gears which, in the illustrated embodiment of the invention, includes a pair of pinion gears 13 and 14 mounted in diametrically opposed relationship and in mating engagement with the side gears. The differential pinion gears 13 and 14 are similarly suitably mounted by stub shafts 15 and 16 which terminate at the inner face of the differential pinion gears and project outwardly into suitable support openings in the differential housing or cage 7. This defines a free space within the side gears 9 and 10 and the differential pinion gears 13 and 14 within which, in accordance with the teaching of the present invention, a hydraulic coupling unit 17 is provided to interconnect and insure proper distribution of the input torque of the drive shaft 2 to both of the wheel axle shafts 3 and 4.

Generally, in accordance with the illustrated embodiment of the invention, the hydraulic coupling unit 17 includes an eccentric housing 18 connected to the one side gear 9 and rotating therewith. A stator member 19 is mounted within the eccentric housing and tends to rotate and move in an eccentric motion with respect to the axis of the wheel axles 3 and 4. A rotor member 20 projects into the stator member 19 and the stator and eccentric housing is filled with any suitable hydraulic fluid 21. For example, the fluid may be the conventional differential fluid having an SAE rating of 90 to 140 weight. The rotation of the eccentric causes a resulting movement of the stator which, in turn, interacts with the rotor member 20 to provide a relative rotational movement therebetween. This, in turn, establishes a limited movement of the hydraulic fluid 21 which insures a continuous and limited slip differential action.

Figure 2:
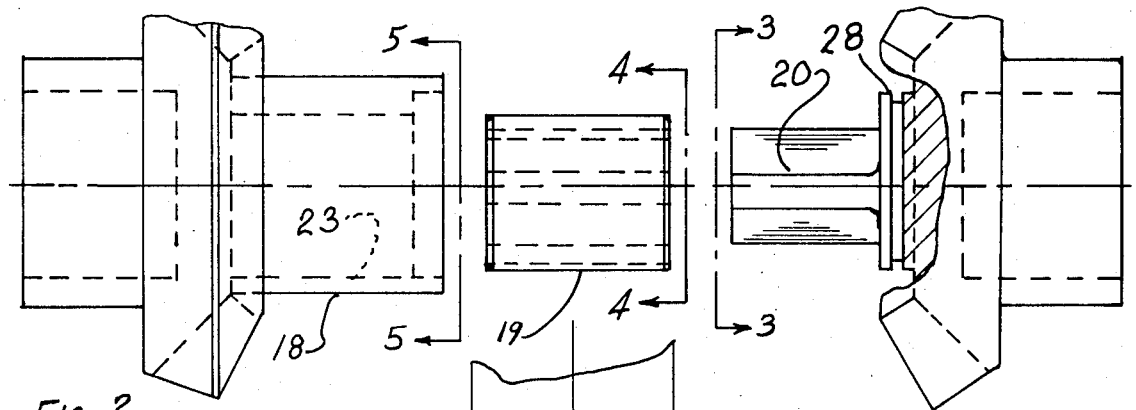
FIG. 2 is an exploded view of the differential side gears and hydraulic coupling unit components of the present invention.

Thus, referring particularly to FIGS. 2-5, an exploded view of the components of the hydraulic unit 17 is more clearly illustrated. In FIG. 2, the one side gear 9 includes the usual splined hub 22 for interconnection to the corresponding wheel axle 3. The eccentric housing 18 is integrally formed with or otherwise rigidly affixed to the inner base and within the beveled teeth of the side gear 9 and projects axially forwardly therefrom. As most clearly shown in FIGS. 5 and 6, the eccentric housing 18 is provided with an inner eccentric opening 23, the axis of which is offset with respect to the wheel axis by a slight predetermined distance. The eccentric opening 23 extends outwardly from the base portion of gear 9 with the outermost portion of the housing 18 provided with an enlarged circular opening 24 concentric with the wheel axis and the axis of the beveled gear. The length of the eccentric housing, as most clearly shown in FIG. 1, corresponds to the spacing between the side gears 9 and 10 such that in the assembled relation, the face of the opposing side gear 10 abuts the outer end face of the eccentric housing 18.

The stator member 19 is an annular housing having an outer diameter corresponding to the diameter of the eccentric opening 23. The stator member 19 fits within the eccentric opening and is free to rotate therein. The stator member 19 is provided with a multiple pocket stator opening 25 which is filled with the hydraulic liquid 21, as most clearly shown in FIG. 6. Generally, the opening 25 is a multiple pointed star configuration which, in the illustrated embodiment of the invention, includes five outwardly extending projections or pockets 26 terminating in relatively flat peripheral surfaces which are interconnected by similar generally curved wall portions with the radius of the curves corresponding to each other and selected to maintain a predetermined constant diametrical length for the stator opening 25. The stator member 19 is located within the eccentric opening and is held therein, in the illustrated embodiment of the invention, through the construction of the rotor member 20.

Thus, the rotor member 20 includes a main body within the stator opening 25, and with an axial length corresponding to the depth of the eccentric opening 23. The main body includes a plurality of arms 27 of a lesser number than pockets 26. In the illustrated embodiment, the rotor has four equicircumferentially spaced arms 27 with the outer surfaces rounded to provide smooth bearing surfaces. The arms 27 are located in opposed relationship and the diametrical length to the outermost peripheral portions essentially corresponds to the constant diametrical length of the stator opening 25. The rotor is located within the opening 23 with a pair of adjacent arms generally mating with a pair of adjacent pockets 26, and with the other opposed arms 27 located adjacent the pocket bridging wall portions, such that one is moving toward such portion and the other is moving into a pocket 26 depending upon the direction of rotation. The rotor 20 thus tends to walk about the stator 19 with the arms 27 engaging successive pockets 26 and with the stator moving eccentrically to permit the walking movement. With the hydraulic unit filled with a suitable fluid 21, however, the movement is not free but opposed by the fluid action.

As shown in FIGS. 1-3, a sealing flange member is secured to the outer end of the main body and fits within the concentric circular opening 24 of the eccentric housing 18. The flange 28 is generally of a corresponding depth of opening 24 and is provided with a centrally located annular recess within which an O-ring seal 29 is disposed. The unit, in the assembled relation, has the rotor 20 held within the eccentric housing 18 by the mounting of the side gear 10 to which the flange 28 is suitably rigidly attached by integrally forming, welding or any other suitable method.

The stator 19 is thus coupled through the eccentric opening 23 to the housing 18 and thereby to the one side gear 9. The stator 19 is also coupled to the rotor 20 through the mating arms 27 and pockets 26 and thereby to the opposite side gear 10.

In the operation of the device, the opposed arms of the rotor tend to move or force the oil within the rotor forwardly within the projecting arm portions or openings. The relative motion of the two members as a result of the relative rotation of the eccentric, in turn, determines the relative back pressure built up within the hydraulic system. Although there is a relatively close fit between the peripheral ends of the rotor arms and the peripheral opening of the generally star-shaped stator opening, the tolerance is such that the liquid can move therebetween to prevent a complete, non-slipping locking of the unit. A typical relative dimensional relationship is shown in FIG. 3 and FIG. 4 and an enlarged view is shown in FIG. 6 with the tolerance between the rotor 27 and the stator 19 greatly exaggerated to show the flow passageway in the illustrated embodiment of the invention. Generally, the clearance and tolerance is within a few thousandths of an inch such as found in the known rotor type pump such as employed in automobile oil pumps. However, the rate of flow determines the torque relationship and thus determines the effective locking of the differential unit. Further, this action produces a continuous and progressive response related to the incipient relative rate of rotation; thus, relative slow rotation of the rotor and stator relative to the housing 18. The resistance to such relative movement is essentially controlled by the characteristics of the fluid 21 and the clearance between the rotor arms 27 and the wall portions of the stator opening in stator 19. As the relative speed tends to increase, a greater flow of fluid 21 must be created. However, the clearance limits the flow rate and thus provides an intercoupling with the transfer of power from the more rapidly moving unit to the opposite side. Further, the coupling is essentially related to the difference in speed and thus produces a smooth and gradual coupling. This permits the normal differential action to permit desired turning of the vehicle but produces a continuous response to any appreciable undesired differential driving of the wheels from the common drive shaft.

Actual construction and testing of the unit in an automobile has shown that the unit not only provides an improved limited slipping differential but contributes very dramatically to the stability in the operation of the automobile; for example, in driving over rough roads and the like. The new differential tends to minimize any tendency for the automobile to sway or move from the intended direction of movement as a result of a differential power-driven movement of the driving wheels, apparently as a result of maintaining essentially similar and constant equalized driving forces at the two wheels. Thus, if either wheel tends to increase in speed significantly with respect to the opposite wheel, the rapid wheel becomes a driving force to the hydraulic unit. As a result, the rapid driven member tends to establish a pumping action which transfers power to the opposite wheel. For example, an uneven road surface may result in disengagement of a wheel with a tendency for such wheel to accelerate such that re-engagement with the road surface creates a disturbing swaying or torque force on the vehicle relative to the desired direction of the vehicle. The continuous slip differential concept responds immediately to limit the tendency for any such disturbance and thereby substantially minimizes any such disturbing forces and thereby contributes to the stability of operation.

Further, the limited slip differential insures an interacting braking action. Thus, if the brake of one wheel establishes a greater locking action than the other, the hydraulic unit will transmit the locking force to the opposite wheel and provide an improved stopping action.

Although described with the rotor aligned with the wheel axis, the same result can, of course, be obtained with alighnment of the stator opening with the wheel axis and a related shifting of the rotor axis. Further, other particular forms of hydraulic couplings might be employed within the broadest teaching of the present invention. Thus, vane-type pumps having radially moving spring-loaded vanes mounted in an eccentric rotor might be employed. Such devices are relatively expensive and having moving parts which are not as reliable as the illustrated embodiment which can be produced at a reasonable cost. The illustrated embodiment is also a rugged and reliable construction. Further, the hydraulic assembly may be connected to the differential pinion gears rather than the side gears as illustrated.

The apparatus is relatively simple to construct and does not require highly or close tolerances in the dimensioning of the several elements. Further, as previously noted, it is particularly adapted and useful in that the unit can be directly applied to conventional and existing differential units by merely inserting the necessary modified gearing to produce a hydraulic drive system within the differential unit. This may be readily accomplished by forming of new side gears with the hydraulic elements or even appropriate modifying of the existing elements, if so desired.

Various modes of carrying out the invention are contemplated as being within the scope of the following claims which particularly point out and distinctly claim the subject matter which is regarded as the invention.

I claim:

1. A differential gearing unit comprising a common input member and a pair of output gear means interconnected by at least one differential pinion gear means, and a hydraulic coupling unit connected to said output gear means and including a pair of relatively moving members with a confined flowing fluid with a restricted flow and thereby directly establishing hydraulic loading of said gear means and establishing an essentially continuous limited-slip and stabilizing coupling of said pair of output gear means, said pair of relatively moving members including a stator member defining a chamber and a multiple arm rotor member within said chamber and having a plurality of arms defining pockets within said chamber with a restricted flow means between the rotor member arms and said chamber being filled with a confined flowing fluid, said stator member being coupled to said one output gear means and said rotor member being coupled to the second output gear means and said flowing fluid moving between said pockets flowing through the restricted flow means establishing hydraulic loading on said output gear means and in accordance with any difference in the rotational velocity of the pair of output gear means and thereby establishing an essentially continuous limited-slip hydraulic coupling of said pair of output gear means.

2. The differential gearing unit of claim 1, wherein said hydraulic unit includes an eccentric housing having an eccentric opening, said stator being annular and mounted within said opening and having a multiple pocketed central stator opening with a plurality of equicircumferentially spaced outwardly projecting pockets interconnected by corresponding walls to define a constant diametrical length, said rotor being mounted within said stator opening and secured to the second of said output gear means, said rotor having said plurality of corresponding arms of a lesser number than said pockets and mating with said pockets to form a seal with an oppositely disposed arm moving adjacent an intermediate pocket portion to define a restricted opening to limit the flow of fluid therethrough, said housing and rotor being mounted with one of the axes of the eccentric opening and the rotor aligned with the output gear means.

3. The differential gearing unit of claim 2, wherein said common input member includes a differential gear cage having said output gear means mounted in axially spaced relation to aligned opposite sides of the gear cage, a plurality of said differential pinion gear means being mounted in axially spaced relation to aligned opposite sides of the gear cage on an axis normal to said output gear means, said eccentric housing being secured to said first output gear means and projecting axially toward the opposite second output gear means, said housing having said eccentric opening with its axis offset from that of the output gear means.

4. The differential gearing unit of claim 1, wherein said common input member includes a differential gear cage having side bevel gears defining said output gear means, said side bevel gears mounted in axially spaced relation to aligned opposite sides of the gear cage, said differential pinion gear means including diametrically spaced pinion gears mounted in axially spaced relation to aligned opposite sides of the gear cage on an axis normal to said side gears, said hydraulic unit including an eccentric housing integrally formed with a first of said side gears and projecting axially toward the opposite side gear, said housing having an eccentric opening with its axis offset from that of the side gears, an annular stator mounted within said opening and having a multiple pocketed central stator opening with five of equicircumferentially spaced outwardly projecting pockets interconnected by corresponding intermediate curved walls to define a constant diametrical length, a solid rotor mounted within said stator opening and integrally formed with the second of said side gears, said rotor having equicircumferentially spaced corresponding radial arms mating with said pockets and of a diametrical length between the ends of said aligned radial arms less than said constant diametrical length to form a seal with one arm in a pocket and an opposite arm moving over an intermediate curved wall to define a restricted opening to limit the flow of fluid therethrough, and a hydraulic oil filling said stator opening.

5. The differential gearing unit of claim 1, wherein said common input member is a vehicle drive shaft coupled to a differential gear cage, said output gear means including a pair of output gears mounted in axially spaced relation to aligned opposite sides of the gear cage, wheel axles secured one each to each of said gears, differential pinion gear means including a plurality of pinion gears mounted in axially spaced relation to aligned opposite sides of the gear cage on an axis normal to said output gears, said rotor having said plurality of corresponding arms of a lesser number than said pockets and mating with said pockets to form a seal with an oppositely disposed arm moving adjacent an intermediate pocket portion to define a restricted opening to limit the flow of fluid therethrough, a hydraulic liquid as said confined fluid filling stator opening, and means to connect said housing to one of said gears and said rotor to a directly opposite gear.

* * * * *